United States Patent [19]
Kusumoto et al.

[11] Patent Number: 5,734,799
[45] Date of Patent: Mar. 31, 1998

[54] IMAGE FORMING APPARATUS

[75] Inventors: Keiji Kusumoto, Toyokawa; Kenich Muroki, Yamaguchi-Ken; Shoji Imaizumi, Shinshiro, all of Japan

[73] Assignee: Minolta Co., Ltd., Osaka, Japan

[21] Appl. No.: 66,651

[22] Filed: May 25, 1993

[30] Foreign Application Priority Data

May 30, 1992 [JP] Japan .................................. 4-164399

[51] Int. Cl.⁶ .................................................... G06K 15/00
[52] U.S. Cl. ........................ 395/106; 395/109; 358/527; 358/515; 358/518
[58] Field of Search .............................. 395/106, 109, 395/131, 112; 358/515–520, 527, 519

[56] References Cited

U.S. PATENT DOCUMENTS

| | | | |
|---|---|---|---|
| 4,250,522 | 2/1981 | Seki et al. | 358/527 |
| 4,348,735 | 9/1982 | Horiguchi et al. | 358/527 |
| 4,364,084 | 12/1982 | Akimoto et al. | 358/506 |
| 4,639,770 | 1/1987 | Jung et al. | 358/527 |
| 4,670,780 | 6/1987 | McManus et al. | 358/518 |
| 4,958,220 | 9/1990 | Alessi et al. | 358/527 |
| 5,142,616 | 8/1992 | Kellas et al. | 395/135 |
| 5,309,257 | 5/1994 | Bonino et al. | 358/504 |

OTHER PUBLICATIONS

Japanese Abstract JP402397323A.

*Primary Examiner*—Dwayne Bost
*Assistant Examiner*—Traay M. Legee
*Attorney, Agent, or Firm*—Burns, Doane, Swecker & Mathis, LLP

[57] ABSTRACT

An image reading apparatus for outputting printing data to an image forming apparatus. The image reading apparatus has document reader for reading an image from a document to produce color separation data as to three colors, image data processor for converting the color separation data to printing data, converter means for converting the printing data to display data and display for displaying an image based on the display data.

8 Claims, 19 Drawing Sheets

FIG. 19
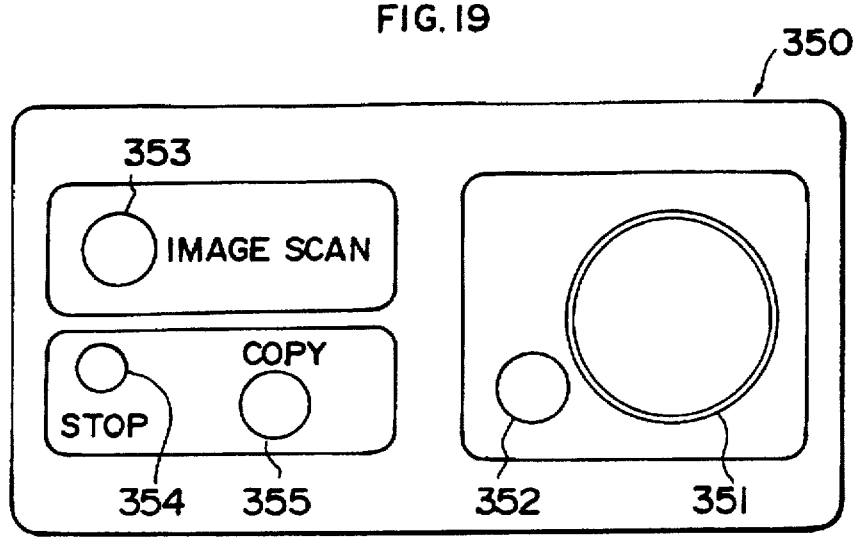
FIG. 20(a) inclination change
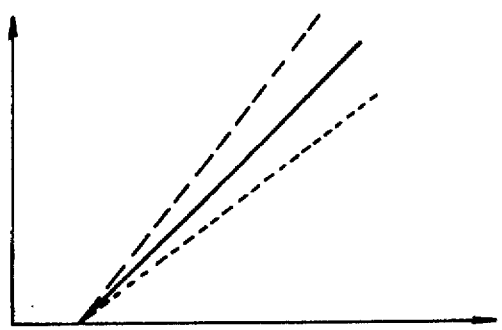
FIG. 20(b) bias level change
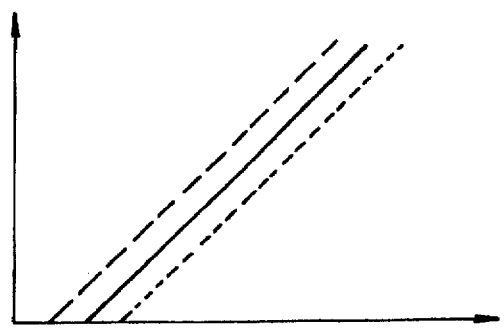

IMAGE FORMING APPARATUS

BACKGROUND OF THE INVENTION

1. Field of the Invention

The present invention relates to image forming apparatus such as digital color copying machines. More particularly, the invention relates to an apparatus by which the image to be printed can be recognized as presented on a display before printing out.

2. Description of the Related Art (1) Japanese Laid-Open Patent Application No. 63-174076 discloses an electrophotographic printer having a preview device. This printer is adapted to display images on a monitor based on video signals produced by reading images from a document and electrophotographically reproduce images on paper by scanning the document with light.

(2) U.S. Pat. No. 4,364,084 discloses a color film checking device. The device is adapted to store image data obtained by scanning a color film, calculate optimum amounts of correction of colors and density based on the image data to modify a look-up table and process the image data with reference to the look-up table to display an image. The device also has the function of outputting optimum printing data for printing the film.

When digital color copying machines are used, it is desired to prevent copying errors by checking the quality of print images as to colors, etc. before printing out.

For this purpose, it is useful to display and check images on a monitor as practiced by the systems of the above publications. However, in the case where digital color copying machines are employed for uses in which meticulous reproduction of colors is important, the systems of the publications are still unsatisfactory.

With the systems of the publications, images are displayed on the monitor based on the color separation data obtained by reading documents, whereas the color separation data is not in a linear relationship with the data for printing out (the data of the recording system, i.e., Y.M.C data). Accordingly, the quality of images displayed on the monitor is not strictly equivalent to the quality of images to be printed out.

SUMMARY OF THE INVENTION

The main object of the present invention is to make it possible to display on a monitor images which are equivalent in quality to those to be printed out.

Another object of the invention is to provide an apparatus which can be manipulated and operated by simplified procedures in the case where the above-mentioned strictness is not required.

These objects are fulfilled by an image reading apparatus having the following construction for outputting printing data to an image forming apparatus. The image reading apparatus comprises document reading means for reading an image from a document to produce color separation data as to three colors, image data processing means for converting the color separation data to printing data, conversion means for converting the printing data to display data, and display means for displaying an image based on the display data.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

FIG. 19 is a diagram for illustrating an operation panel on the film scanner device; and FIGS. 20(a) and 20(b) are diagrams for illustrating what is processed by a gamma correction unit of FIG. 3.

DESCRIPTION OF THE PREFERRED EMBODIMENTS

Embodiments of the present invention will be described in the following order.

1. Outline of the system
2. Film scanner device
3. Digital color copying machine
4. Outline of image processing 5. Control of the system (see flow charts)

1. Outline of the System

Figure 1:
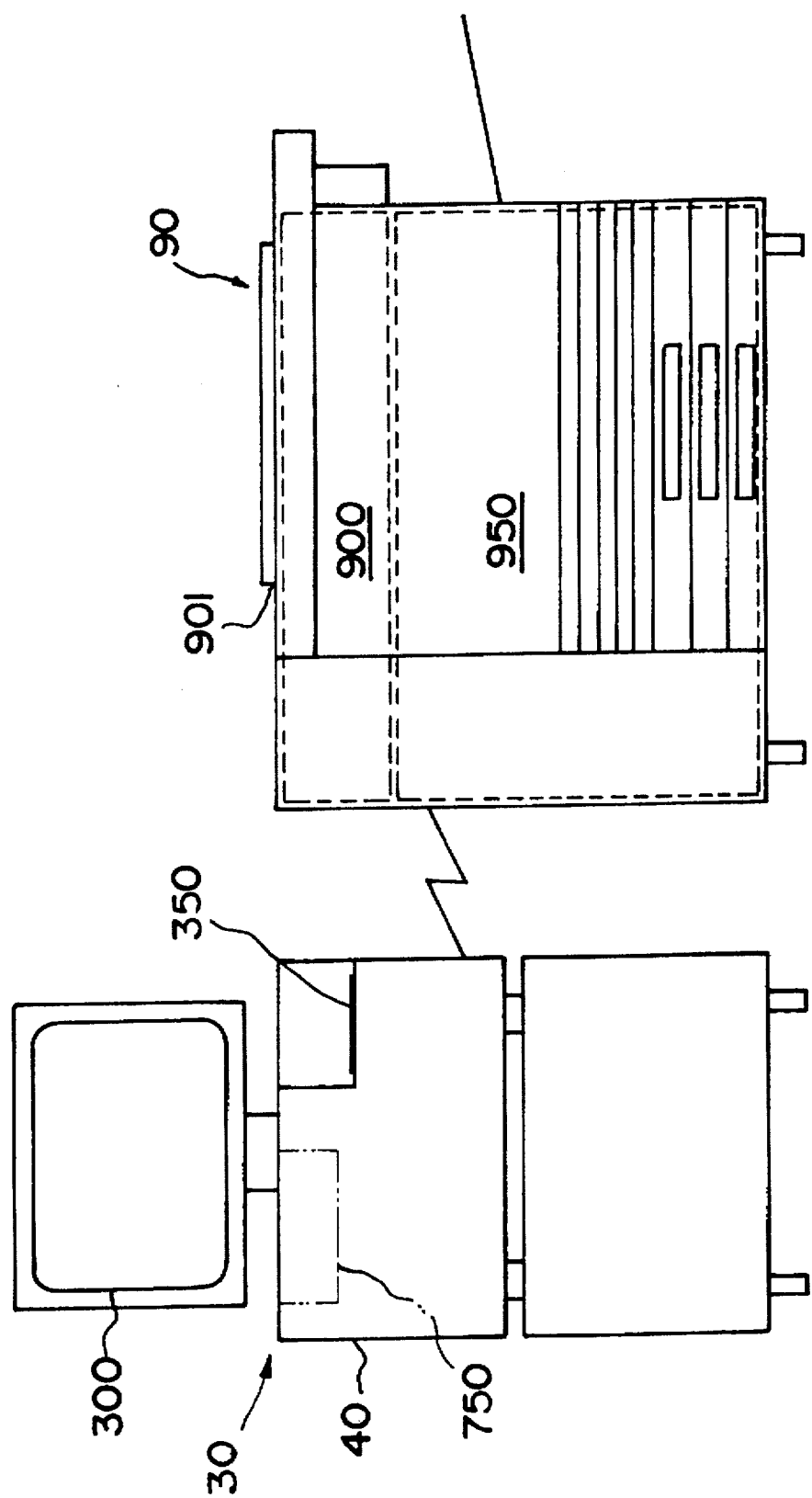
FIG. 1 is a front view schematically showing a system embodying the invention and comprising a film scanner device and a digital color copying machine.

FIG. 1 shows a system embodying the invention and comprising a film scanner device 30 and a digital color copying machine 90.

The film scanner device 30 scans an image on a film (negative or positive film) set in a truck 750 of the body 40 of the device to show the image on a CRT display 300. The device 30 is also adapted to transmit the read image data to the digital copying machine 90 to form a color image on paper.

The digital color copying machine 90 comprises an image reader 900 for reading an image from a document set on a document table 901 to produce image data, and a printer 950 for producing CMY data based on RGB image data transmitted from the image reader 900 or the film scanner device 30 and forming an image on paper.

The present system is adapted to command execution of the following processes or operations by inputs given by manipulating a group of key switches (see FIG. 19) on an operation panel 350 of the scanner device 30 and a group of display switches (see FIG. 8) on the CRT display 300.

(1) Document reading operation by the digital color copying machine 90.

(2) Process for causing the machine 90 to transmit the image data produced by the document reading operation (1) and causing the CRT display 300 to display an image thereon. Transmission of image data involves two cases; i.e., RGB data and CMY data produced by reading the document three times as will be described below.

(3) Process wherein the image presented on the CRT display 300 based on the RGB data of the process (2) is adjusted, for example, in color, and command data representing the degree of adjustment is transmitted to the digital color copying machine 90. The command data transmittable includes, for example, data as to color changes, color erasure, contour extraction, trimming, color tone changes, sharpness and image quality monitoring. In corresponding relation to the data forwarded, the color copying machine 90 corrects data, for example, as to gamma correction. Next, the document is read three times to produce CMY data, which is then processed with the command data and transmitted to the film scanner device 30. Based on this data, the film scanner device 30 shows an image on the CRT display 300 again.

(4) Specifying a printing-out mode on the color copying machine 90 by trimming or otherwise editing the image presented on the CRT displays 300 based on the RGB data of the process (2). Additionally, for example, masking, magnification, transfer or mirror image can be specified.

(5) Causing the digital color copying machine to execute a copying operation using the command data mentioned in the process (3). More specifically stated, execution and preparation of CMY data from the data obtained by reading the document three times, correction with use of the command data of the process (3) and printing out based on the CMY data.

2. Film Scanner Device

Figure 4:
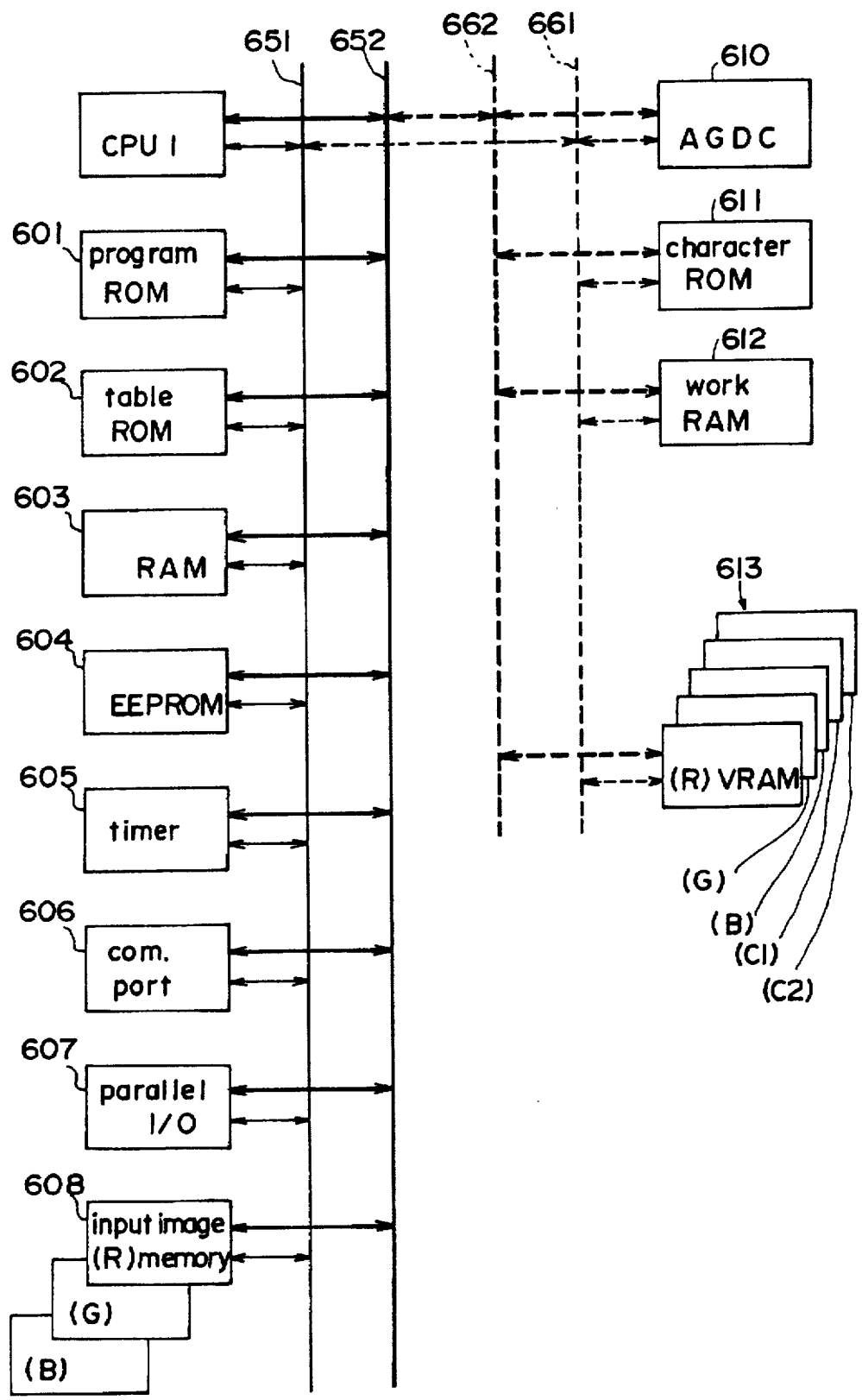
FIG. 4 is a block diagram showing the construction of control circuit of the film scanner device of FIG. 1.
Figure 8:
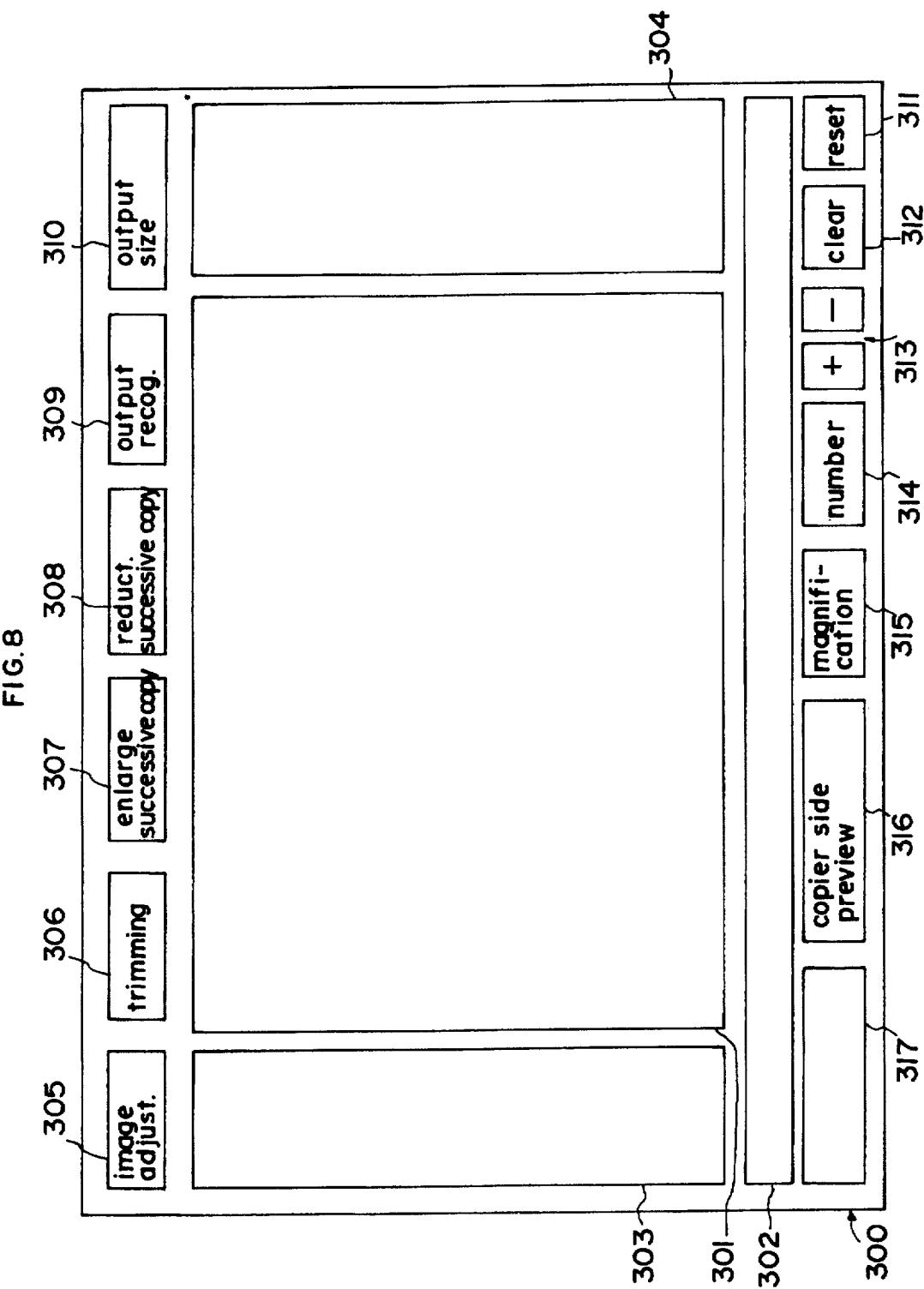
FIG. 8 is a diagram for illustrating an example of display screen on a CRT display included in the film scanner device of FIG. 1.

FIG. 19 is a diagram for illustrating the key switches on the operation panel 350 on an upper surface of body 40 of the scanner device 30, FIG. 8 is a diagram for illustrating an example of screen on the CRT display 300, and FIG. 4 is a block diagram showing the construction of control circuit of the film scanner device 30.

2-1. Screen Presentations and Means for Entering Inputs

With reference to FIG. 8, the CRT display 300 of the present film scanner device 30 has an image region 301 for presenting, for example, the image read by the scanner device 30 or the image read by the color copying machine 90, and is further provided with a message region 302 for presenting various messages, pull-down menu regions 303, 304 for displaying pull-down menus, copy number display region 314 for showing the number of copies (prints) to be made, magnification display region 315 for showing a predetermined copy (print) magnification and film size display region 317.

The CRT display 300 further has regions for various switches (display switches) including an image adjusting switch 305, trimming switch 306, enlarged successive copy switch 307, reduced successive copy switch 308, output recognition switch 309, output size switch 310, reset switch 311, clear switch 312, copy number increment-decrement switches 313 and copying machine preview switch 316. These display switches are specified in position by a cursor which is movable by manipulating a trackball 351 of FIG. 19, and are turned on or off by manipulating a tab key (trackball input key) 352. Every time the switch is turned on or off, the presentation of the switch region concerned is reversed.

The message region 302 presents various messages instructing the operator to enter an input, stating that the film carrier has been removed, or indicating the type of film and output paper size.

Briefly, the display switches have the following functions.

For example, the enlarged successive copy switch 307, when turned on, shows a submenu, permitting setting of an output size. The reduced successive copy switch 308, when turned on, sets a reduced successive copy mode. Depression of the output size switch 310 displays a submenu and renders a paper size settable. Depression of the reset switch 311 initializes the copy mode. The copy number increment or decrement switch 313, when turned on, increases or decreases the number of copies. The functions of the copying machine preview switch 316, image adjusting switch 305, trimming switch 306 and output recognition switch 309 will be described later.

Besides these switches, the display switches also include those shown in FIGS. 10 and 11 for the pull-down menus to be described later.

In addition to the foregoing display switches on the CRT display 30, the present film scanner device 30 has the aforementioned group of key switches on the operation panel 350 on the upper surface of the device body 40, or a group of key switches on an unillustrated inner panel inside the body 40. Various commands are also input by manipulating these switches.

For example, the operation panel 350 is provided, as shown in FIG. 19, with the trackball 351, tab key (trackball input key) 352, image input key 353 for commanding the scanner device 30 or copying machine 90 to read a document image and commanding presentation of the read image on the CRT 300, stop key 354 for commanding cessation of operation and print key (copy key) 355 for commanding printing-out by the copying machine 90.

The trackball 351 is a ball which is rotatable manually. The rotation of the trackball 351 moves the cursor on the CRT display 300. The tab key (trackball input key) 352 is a key for inputting the coordinates specified by the cursor. For example, when the tab key (trackball input key) 352 is manipulated with the cursor specifying one of the display switches, the mode or operation indicated by the display switch is selected.

2-2. Control Circuit

FIG. 4 shows a CPU 1 for controlling the present scanner device 30.

Via a data bus 651 and an address bus 652, the CPU 1 is connected to a program ROM 601, table ROM 602, RAM 603, EEPROM 604, timer 605, communication port 606, parallel I/O 607 and R, G and B input image memories 608 which are prepared for R, G and B, respectively.

The program ROM 601 has stored therein a program for the CPU 1. The RAM 603 is used for storing various variables necessary for executing the program. EEPROM 604 is used for storing parameters for adjusting variations between individual devices. The timer 605 is used for preparing a predetermined timer value from a clock signal when set by the CPU 1. The communication port 606 is used for data transmission with external devices. The parallel I/O 607 is used for outputting signals for controlling peripheral devices and receiving state signals from the peripheral devices. The input image memories 608 are used for storing read image data.

On the other hand, a display controller (AGDC) 610 for controlling the representation by the CRT display 300 is connected to a ROM 611 for kanji (Chinese characters used in Japan), RAM 612 for working and VRAM 613 via an AGDC address bus 662 and AGDC data bus 661. The VRAM 613 has five planes, i.e., three image palnes for image data as to the different colors, and two character planes C1 and C2 for a fixed element such as the display switch on the CRT display 300 and for a movable indicator elements such as the cursor, trimming frame or the like.

The image data stored in the input image memories 608 is transferred to and stored in the image planes of the VRAM 613 under the control of the AGDC 610. At this time, the image data is partially cut out, enlarged, contracted or otherwise processed under the command of the CPU 1.

3. Digital Color Copying Machine

Figure 2:
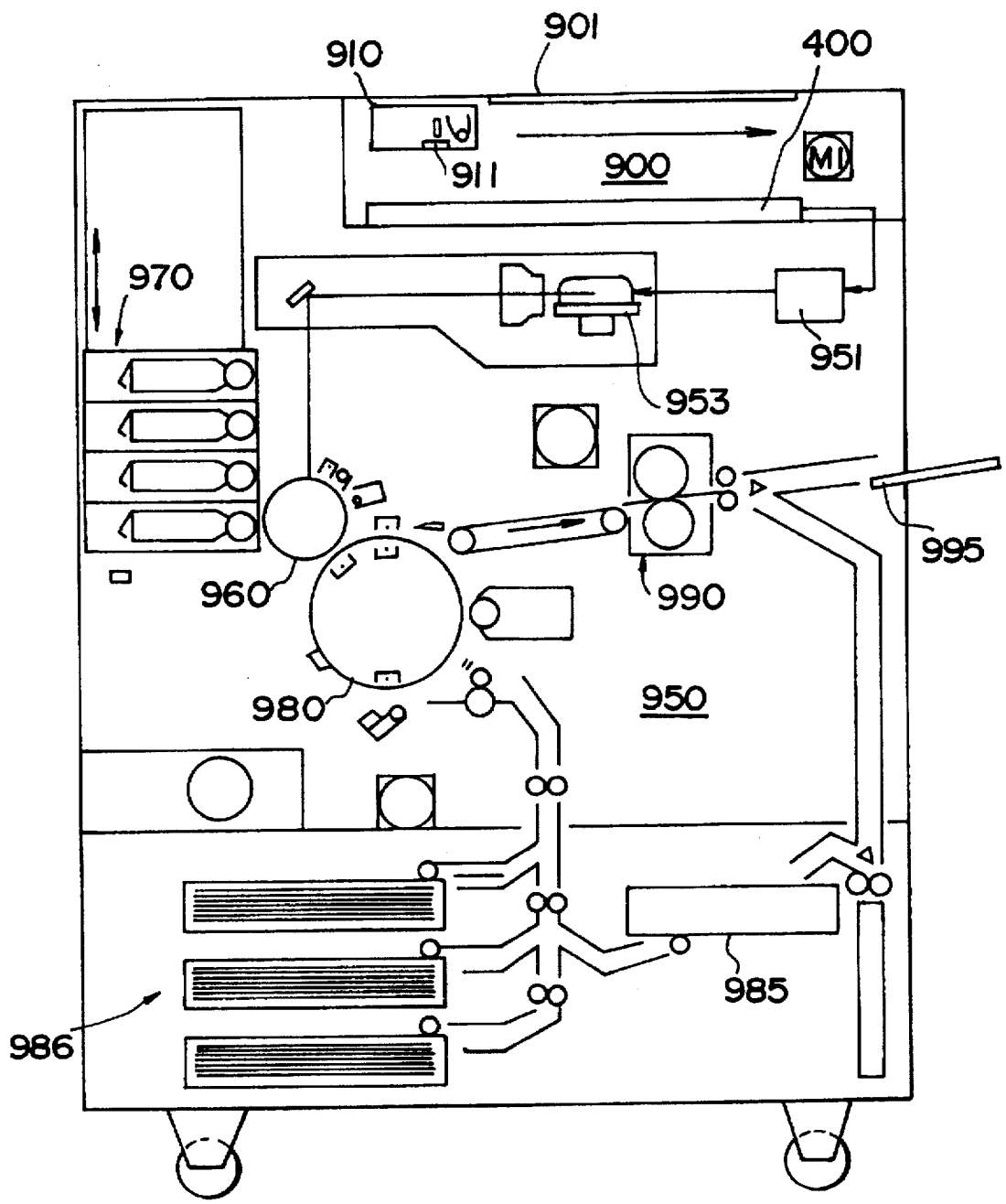
FIG. 2 is a diagram for illustrating the construction of the copying machine of FIG. 1.
Figure 3:
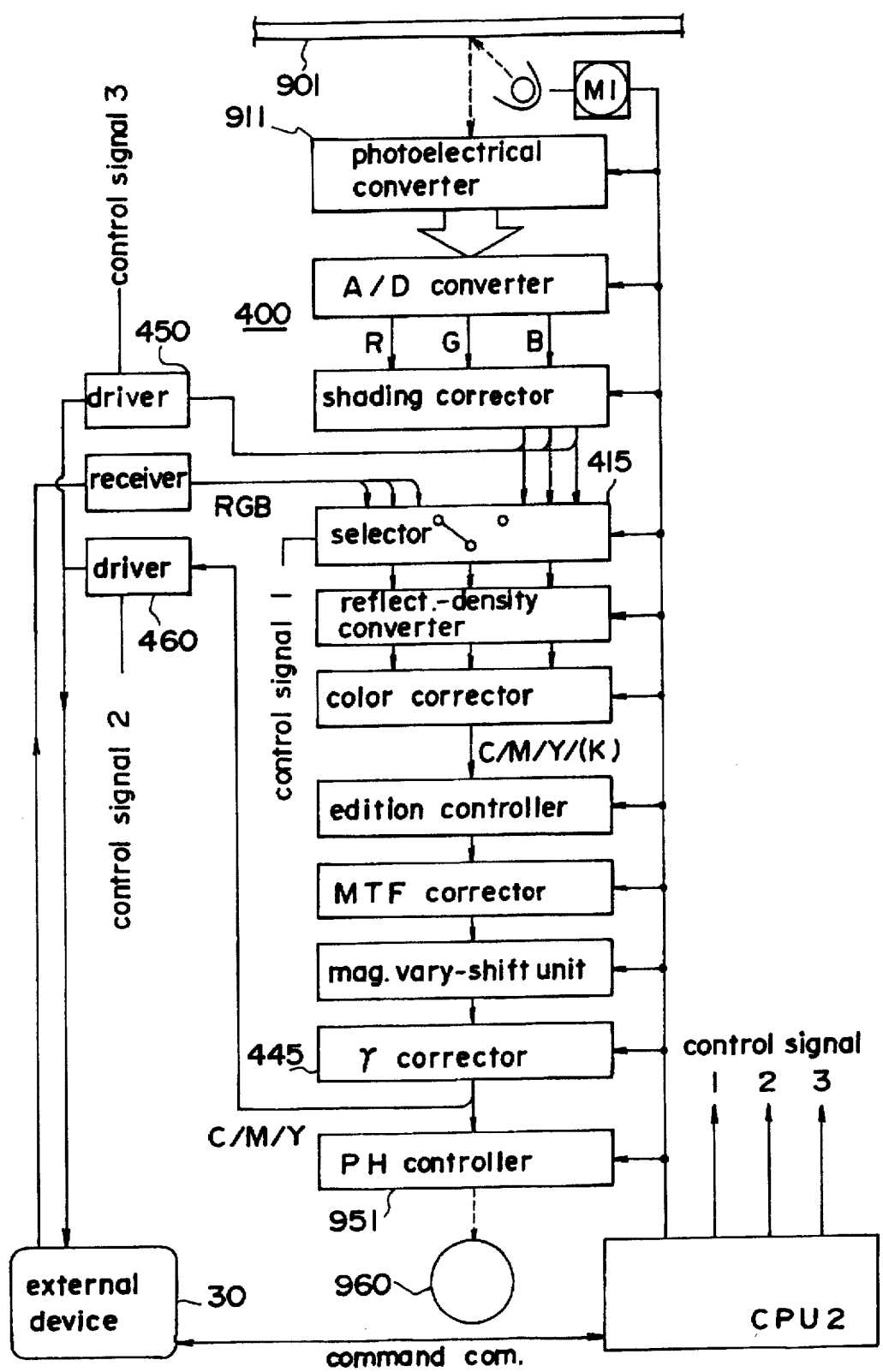
FIG. 3 is a block diagram showing image processing control of the copying machine of FIG. 1.

FIG. 2 shows the internal construction of the digital color copying machine 90, and FIG. 3 shows the image processing procedure to be executed by the copying machine 90.

3-1. Construction

The digital color copying machine 90 comprises a document reader 900 for reading an image from a document on a document table 901, and a printer 950 for forming an image on paper based on the image data from the document reader 900 or the film scanner device 30.

Figure 17:
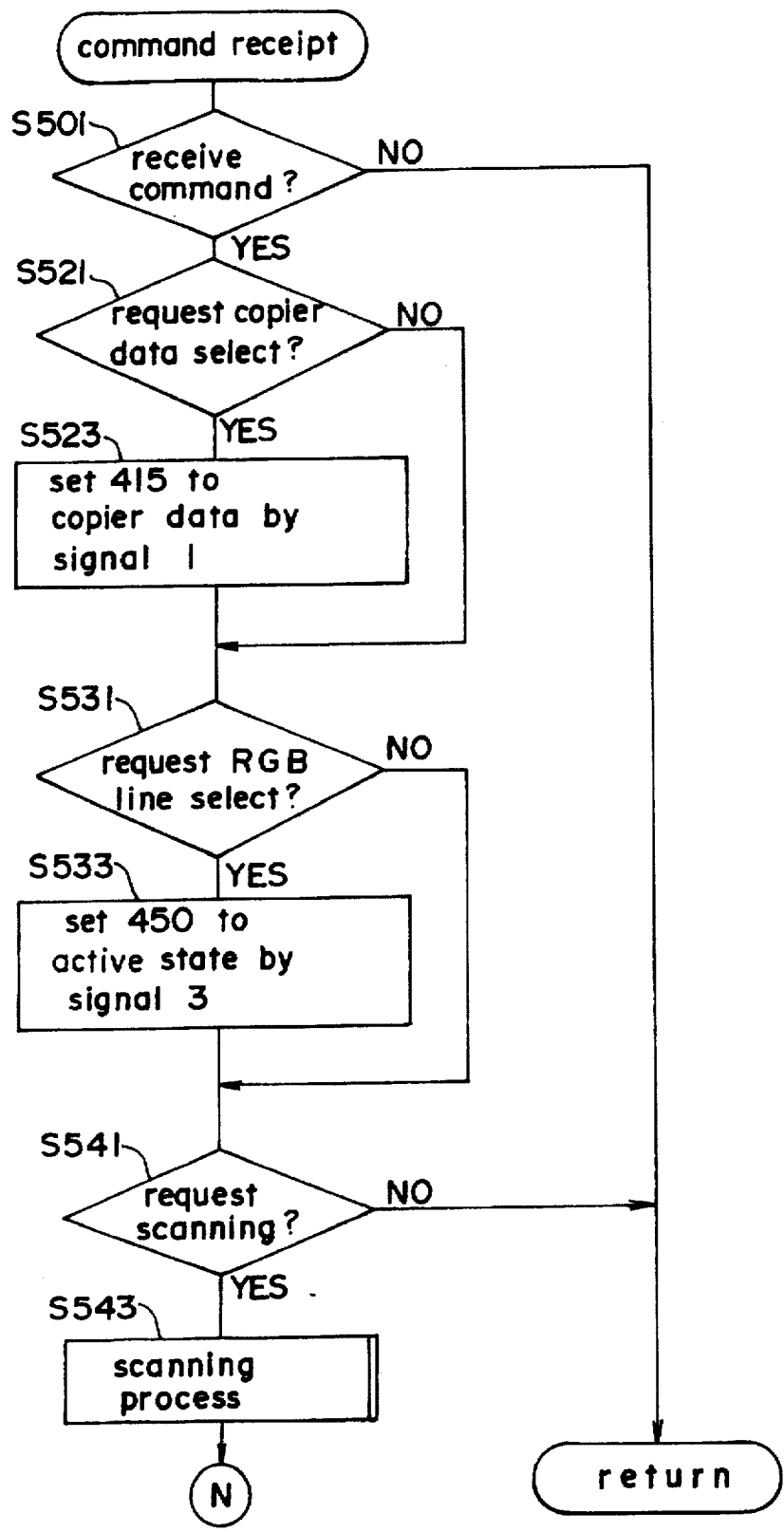
FIG. 17 is a flow chart illustrating a process to be executed by a CPU 2 of FIG. 3, i.e., part of processing in response to a command received from the film scanner device.

The document reader 900 starts a reading operation in response to an input from a copy key on an unillustrated copying machine operation panel or to a request from the scanner device 30 (see FIG. 17, S541). More specifically, a scanning unit 910 is moved along the underside of the document table 901 by the drive force of a scanning motor M1, whereby the document image is read in lines and photoelectrically converted by an image sensor 911.

The electric signal obtained by the photoelectrical conversion is fed to an image processing circuit assembly 400 and thereafter input to a printing head controller 951, whereby the printer 950 is made operable for printing. The signal is processed by the circuit assembly 400 in the manner to be described later with reference to FIG. 3.

Next, the printer 950 will be described.

An electrostatic latent image corresponding to the image data is formed on the surface of a photosensitive drum 960 by a laser unit 953 which is driven by the printing head controller 951.

The latent image is developed into a visible toner image by a developing unit 970, which has four developing devices each containing one of the toners of cyan C, magenta M, yellow Y and black Bk. The developing device selected according to the developing process is positioned in place for development.

The toner image as developed by one of the developing devices on the surface of the drum 960 is then transferred onto paper wound around a transfer drum 980. The paper is fed to the drum, as withdrawn from a paper container portion 986 or intermediate tray 985 and wound around the transfer drum 980, as positioned in place with predetermined timing.

When such a transfer operation has completely been repeated a required number of times in accordance with the color mode, the paper is separated from the transfer drum 980, transported to a fixing unit 990, fixed by being heat-pressed and thereafter delivered onto a paper discharge tray 995. In a mode wherein an image needs to be formed again on the same paper, the paper is transported not toward the paper discharge tray 995 but toward the intermediate tray 985 and subjected to an image forming process again.

3-2. Image Processing Procedure

FIG. 3 shows the process to be executed by the image processing circuit assembly 400.

The electric signal obtained by the above-mentioned photoelectric conversion is first converted to RGB digital data by an A/D converter and then fed to a shading correcting unit, which corrects variations in the amount of light of the exposure lamp and optical system and variations in sensitivity of picture elements of the image sensor.

The shading correcting unit delivers RGB outputs to a selector unit 415 and a driver 450.

The selector unit 415 is a block for selectively determining whether the RGB image data to be forwarded to the printer. 950 is to be derived from the document reader 900 of the copying machine or from the film scanner device (external device) 30, according to a control signal 1 controllable by a CPU 2 (see FIG. 17, S521, S523).

The driver 450 is a block for selectively determining whether the RGB image data produced by the document reader 900 of the copying machine is to be transmitted to the film scanner device (external device) 30, in accordance with a control signal 3 which is controlled by the CPU 2 (see FIG. 17, S531, S533).

The RGB image data fed to the selector unit 415 is sent to a reflectance-density converter for reflectance-density conversion to facilitate the process to be executed by the subsequent block. This block executes tone reproduction processing such as highlight emphasis or shadow emphasis.

The items of RGB image data output from the reflectance-density converter are combined together by a color correcting unit into Y, M or C (or Bk) data (printing system data). Which converted data is to be obtained is determined under the control of the CPU 2 in connection with the operation of the printer 950.

The output from the color correcting unit is sent to a gamma correction unit 445 by way of an editing controller, MTF correcting unit and magnification varying-shift unit.

The editing controller is a block for editing processing. For example, for trimming editing, the area other than the specified area is erased. The MTF correcting unit executes edge emphasis, smoothing and like processing. The magnification varying-shift unit effects change of the pixel density in the main scan direction, shift of the image, repeated outputting of a particular area and other processing.

The gamma correction unit 445 corrects the relationship between the density of document read and the density of image to be reproduced. The density of document read and the density of image to be reproduced are not in a linear relationship-owing to the characteristics of the photosensitive member, characteristics of the toner, other environmental factors, etc. The relationship is therefore corrected by the gamma correction unit 445. Further with the present system, various gamma curve setting ROMs incorporated therein are changed over from one to another under the command of the CPU 2, whereby the image quality, color tone or the like is adjusted (see FIG. 18, S561, S563). The processing methods to be used in this case are (a) a method wherein the inclination of input and output is altered, (b) a method wherein the bias level is altered, and the combination of these methods as shown in FIG. 20.

The output of the gamma correction unit 445 is sent to the printing head controller 951 and to a driver 460.

As previously stated, the printing head controller 951 is a block for driving and controlling the laser unit 953, whereby the printing operation can be performed.

Figure 18:
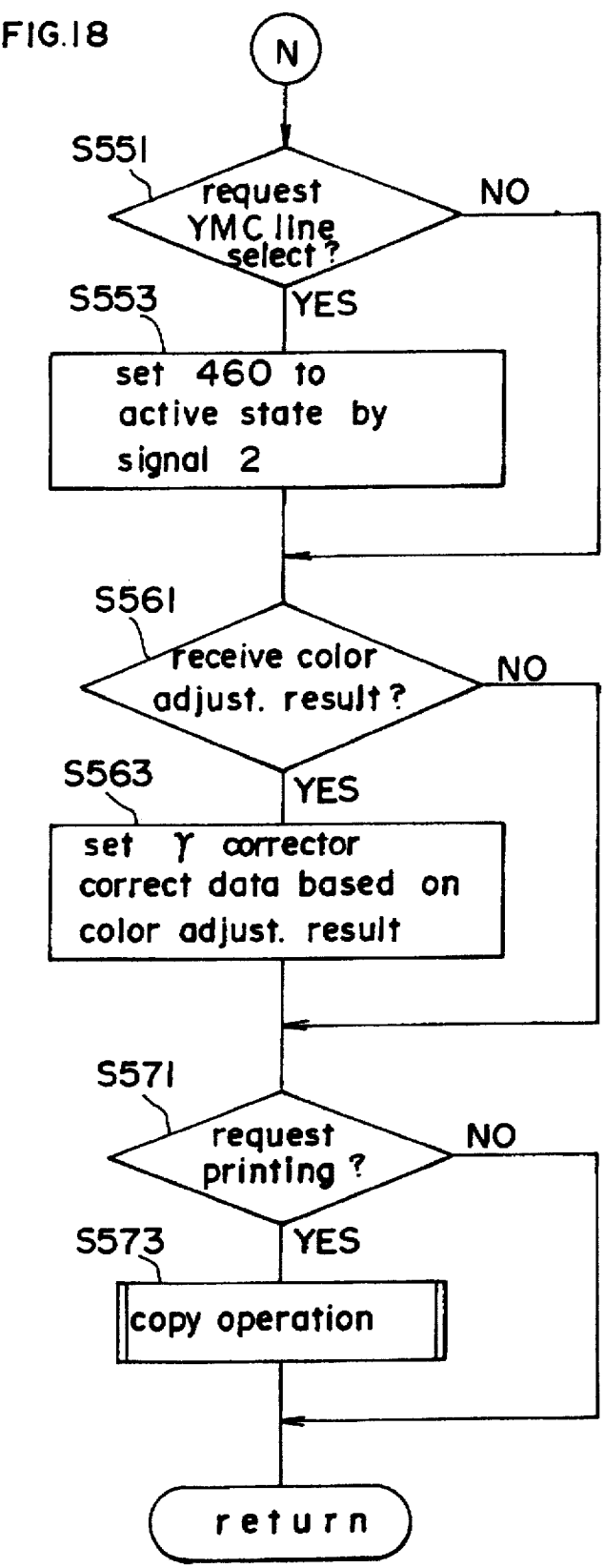
FIG. 18 is a flow chart illustrating a process to be executed by the CPU 2 of FIG. 3, i.e., the remainder of the processing in response to a command received from the scanner device.

The driver 460 is a block for selectively determining whether the Y,M,C image data produced by processing in the image processing circuit assembly 400, i.e., printing system image data, is to be transmitted to the film scanner device (external device) 30, according to a control signal 2 which is controlled by the CPU 2 (see FIG. 18, S551, S553).

4. Outline of Image Processing

Figure 5:
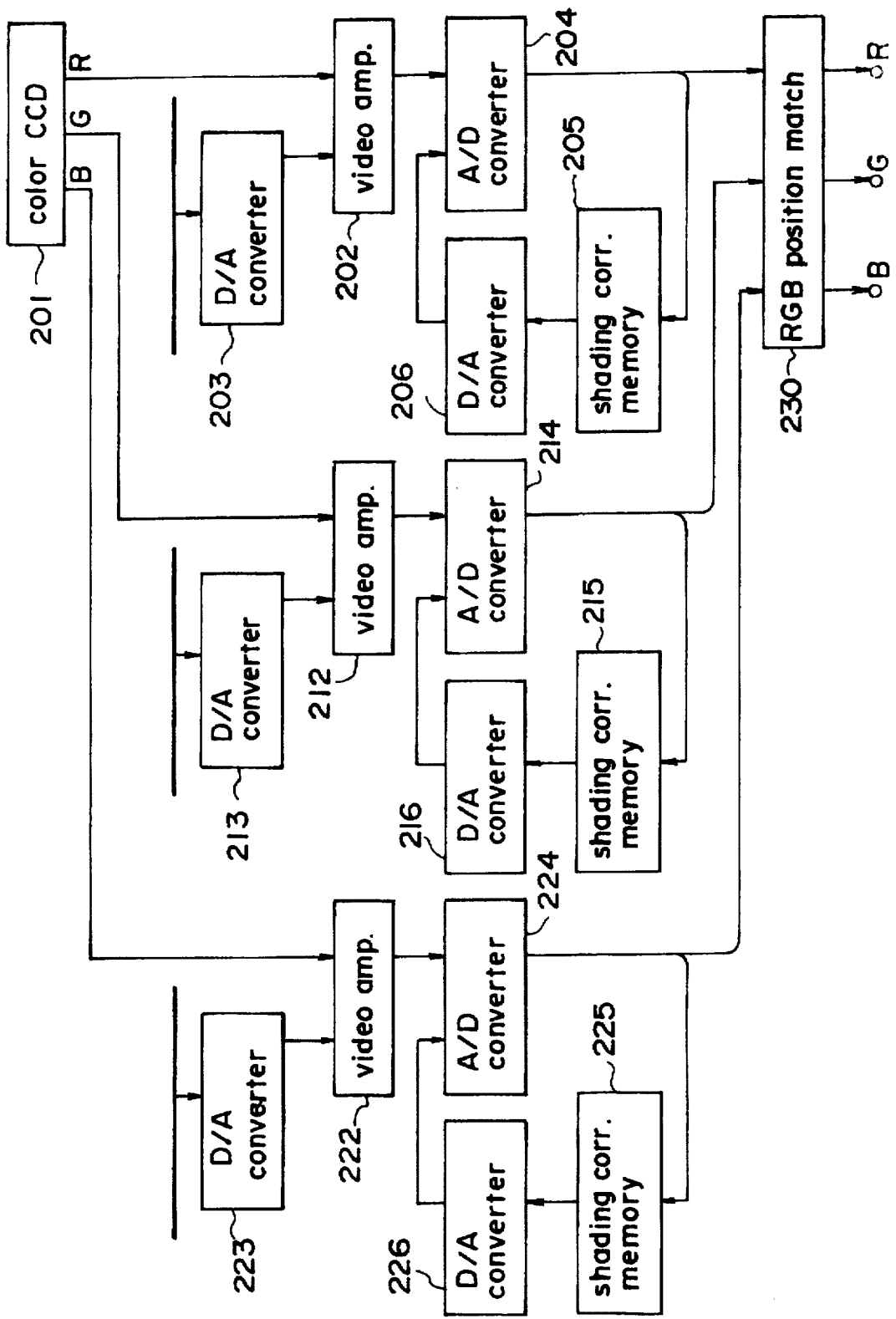
FIG. 5 is part of a block diagram showing image processing by the film scanner device of FIG. 1.
Figure 6:
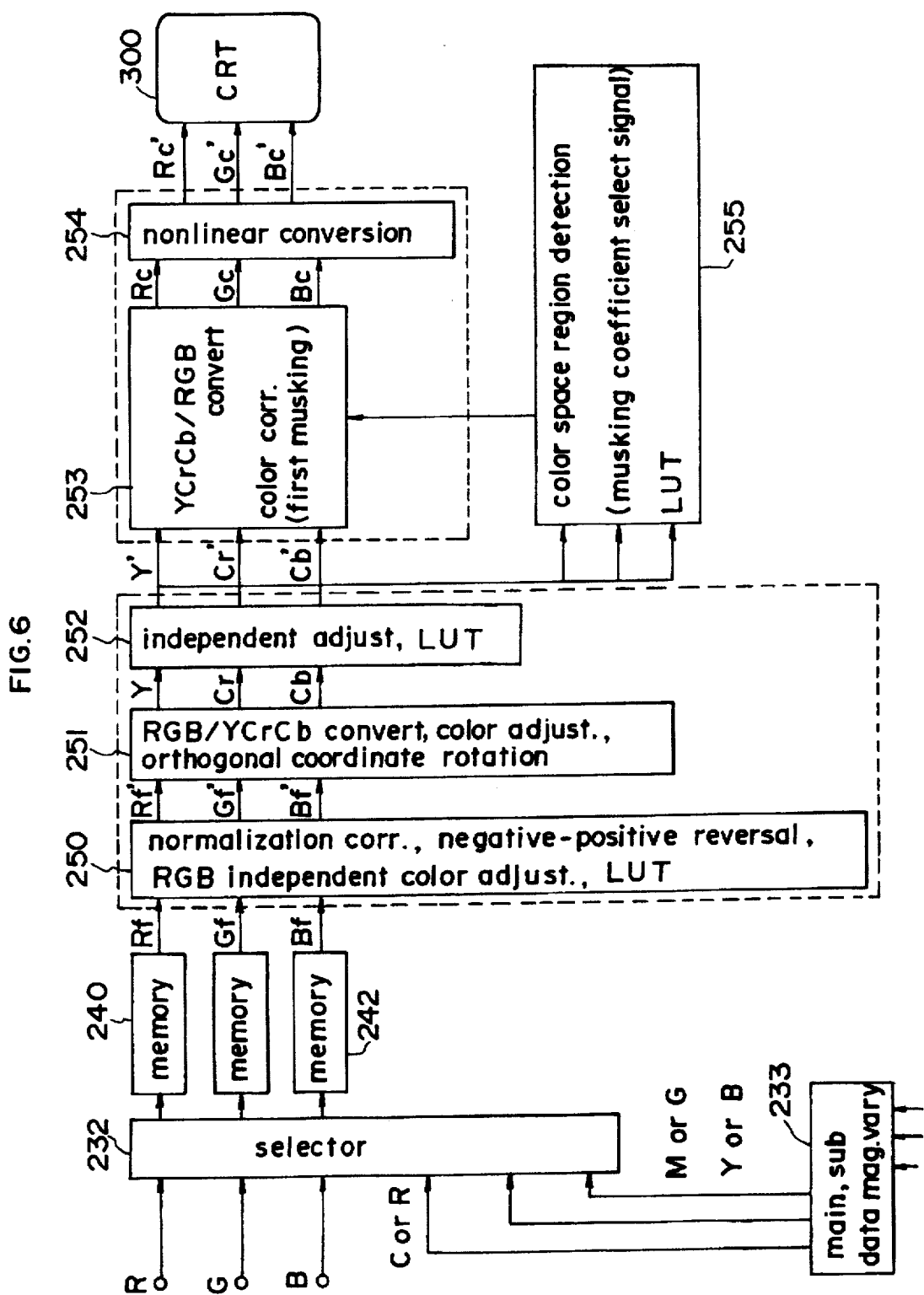
FIG. 6 is part of the block diagram showing image processing by the film scanner device of FIG. 1.
Figure 7:
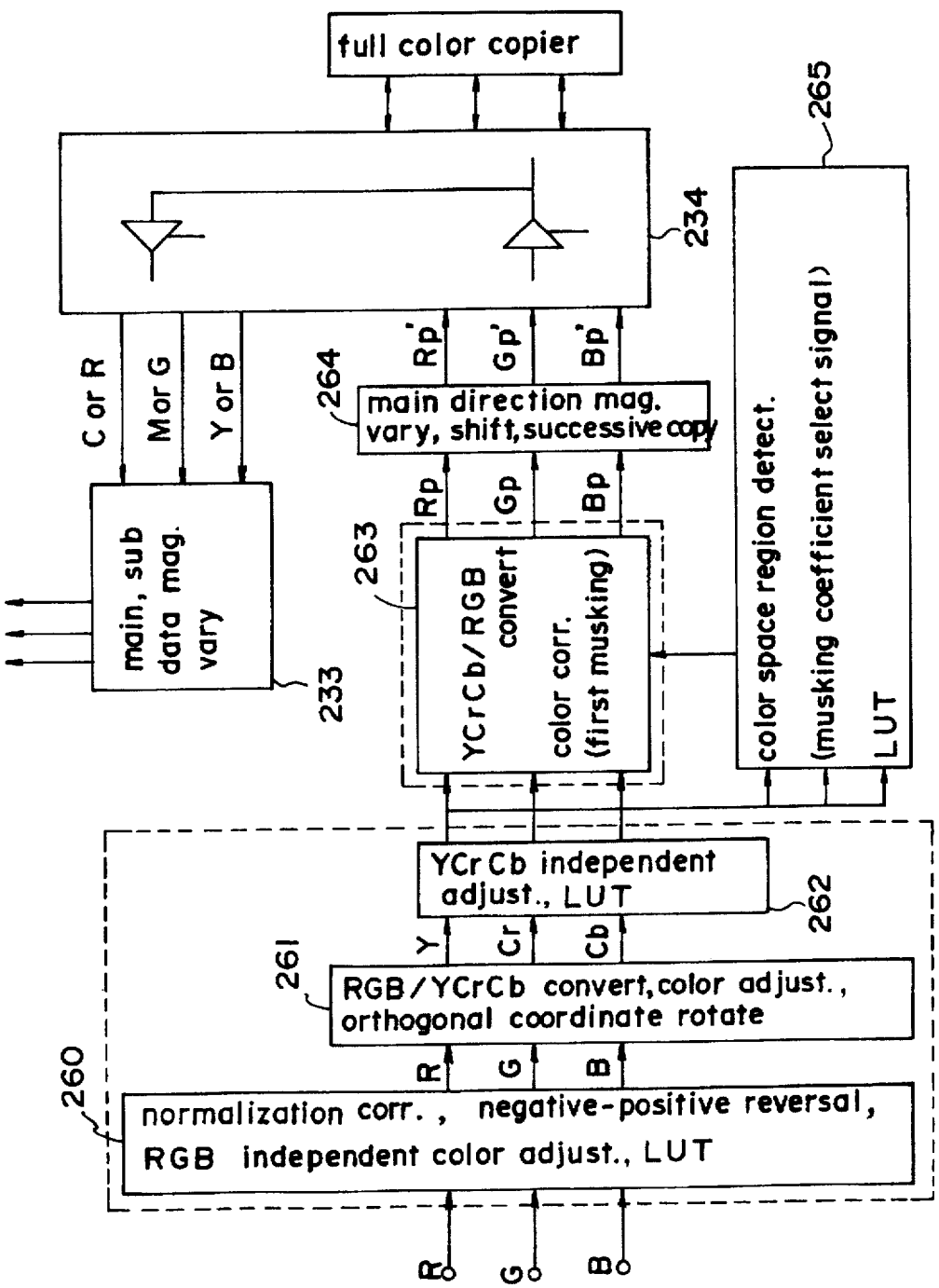
FIG. 7 is the remainder of the block diagram showing image processing by the film scanner device of FIG. 1.

Next, image data processing to be executed by the film scanner device 30 will be described generally with reference to FIGS. 5 to 7.

4-1. Scanner Input

The light transmitted through the film set in position within the track 750 is separated into R, G, B and read in the unit of lines by a one-dimensional color CCD 201 of the scanner device 30. Although a description will be given below chiefly with reference to the R signal, the same is true of the G signal and B signal.

The R signal output from the CCD image sensor 201 is amplified by a video amplifier 202. The ratio of amplification is set by a D/A converter 203 through a data bus so that the maximum value will be a predetermined value. This enables at the maximum level correction of differences between RGB sensitivities due to the difference in the kind of films and correction of differences in the exposure conditions.

The R signal delivered from the video amplifier 202 is then fed to an A/D converter 204 for A/D conversion. At this time, shading correction is also effected with reference to reference data in a shading correction memory 205. More specificaly, reference data stored in the memory 205 by scanning in advance is read therefrom, subjected to D/A conversion by a D/A converter 206 and thereafter input to the A/D converter 204 as a reference voltage.

The R data resulting from the A/D conversion and shading correction is then fed to an RGB position matching unit 230, which is a block for correcting a difference in the timing of the R data relative to the G data and B data occurring owing to the spacing between R, G, B lines of the CCD image sensor 201.

The RGB data output from the RGB position matching unit 230 is divided and supplied to a display route to the CRT display 300 (blocks 232–255) and to a route to the digital color copying machine 90 (blocks 260–265).

4-2. Route to CRT Display

A selector 232 is a block which, in accordance with a command from the CPU 1, determines whether the image read by the film scanner device 30 is to be presented on the CRT display 300 or the image read by the digital color copying machine 90 is to be presented on the display 300. When the present system is set in a copying machine preview mode, the image data from the copying machine 90 is accepted (see FIG. 12, S11, S15) to show the image on the display 300.

The image data accepted from the selector is stored in memories 240 to 242 for presentation on the CRT display 300. These memories are prepared for the respective R, G, B data items, which are readable from CPU 1. An unillustrated character memory is also additionally prepared. The data to be accepted from the copying machine 90 includes RGB data and CMY data.

The output from each memory is input to a corresponding LUT 250.

When the image data from the film scanner device 30 is processed, the LUT 250 executes normalization correcting processing, negative-positive reversal processing and RGB independent color adjustment processing. The normalization correcting processing is executed so that the output range for the input will become a predetermined range at the minimum value of each of the RGB signals. The negative-positive reversal processing is conversion of data read from a negative film to positive data and also to data which is linear relative to the reflectance of the document. The RGB independent color adjustment processing is a procedure for effecting color adjustment on the CRT display 300 to thereby process the input-output relationship independently of the RGB lines.

When the image data from the color copying machine 90 is processed, the LUT 250 is so set that the input and the output are in a linear relationship. In the case where the image data from the copying machine 90 is processed which data is CMY data, negative-positive reversal processing is executed.

Processing of the data output from the LUT 250 differs depending on whether the image data processed is from the film scanner device 30 or from the digital color copying machine 90.

*Case wherein data from film is processed

First in a block 251, R.G.B data is converted to Y.Cr.Cb data, and hue rotation processing is executed by orthogonal coordinate rotation.

Thus, the following processing is executed.

$$\begin{bmatrix} Y \\ Cr \\ Cb \end{bmatrix} = \begin{bmatrix} 1 & 0 & 0 \\ 0 & \cos\theta & -\sin\theta \\ 0 & \sin\theta & \cos\theta \end{bmatrix} \times \begin{bmatrix} 0.299 & 0.587 & 0.114 \\ 0.701 & -0.587 & -0.114 \\ -0.299 & -0.587 & 0.886 \end{bmatrix} \times \begin{bmatrix} R' \\ G' \\ B' \end{bmatrix}$$

The output of the block 251 is fed to each of Y.Cr.Cb LUTs 252. The LUT 252 makes color density adjustment, brightness adjustment or contrast adjustment included in the color adjustment procedure on the CRT display 300. The brightness and contrast adjustments can be accomplished by altering the LUT 252 on the Y data line, and the color density adjustment by altering the LUTs 252 on the Cr and Cb data lines.

The outputs of the LUTs 252 are fed to blocks 253, 255.

The block 253 executes conversion of the Y.Cr.Cb data to R.G.B data and color correction of the film reading data to output data of CRT dispaly 300.

Thus, the following processing is executed.

$$\begin{bmatrix} R \\ G \\ B \end{bmatrix} = \begin{bmatrix} X_{11} & X_{12} & X_{13} \\ X_{21} & X_{22} & X_{23} \\ X_{31} & X_{32} & X_{33} \end{bmatrix} \times \begin{bmatrix} 1 & 1 & 0 \\ 1 & -0.50937 & -0.194208 \\ 1 & 0 & 1 \end{bmatrix} \times \begin{bmatrix} Y \\ Cr' \\ Cb' \end{bmatrix}$$

To effect the color correction for every color space to ensure an increased color correction effect, the block 255 selects the variation coefficient set [$X_{ij}$] by judging the color space from Y.Cr.Cb data.

The output of the block 253 is input to an LUT 254 for nonlinear conversion. The LUT 254, which is provided for every item of R.G.B data, effects conversion from linear characteristics peculiar to the reflectance of the document to nonlinear characteristics peculiar to the CRT display 300. The output of the LUT 254 is sent to the CRT display 300 via an unillustrated D/A converter.

* Case wherein data read by copying machine is processed

When RGB data is forwarded from the copying machine, a unit coefficient matrix is set to the coefficient matrix of the block 251.

Thus, the following processing is executed.

$$\begin{bmatrix} Y \\ Cr \\ Cb \end{bmatrix} = \begin{bmatrix} 1 & 0 & 0 \\ 0 & 1 & 0 \\ 0 & 0 & 1 \end{bmatrix} \times \begin{bmatrix} R \\ G \\ B \end{bmatrix}$$

Further data for making the input and output linear is set in the LUT 252.

The block 253 executes conversion of the RGB data from the copying machine to output color data (color display system data) to the CRT display 300, that is, the following processing.

$$\begin{bmatrix} Rc \\ Gc \\ Bc \end{bmatrix} = \begin{bmatrix} Z_{11} & Z_{12} & Z_{13} \\ Z_{21} & Z_{22} & Z_{23} \\ Z_{31} & Z_{32} & Z_{33} \end{bmatrix} \times \begin{bmatrix} Y \\ Cr \\ Cb \end{bmatrix}$$

On the other hand, when CMY data is forwarded from the copying machine 90, a unit coefficient matrix is set to the coefficient matrix of the block 251, and data for making the input and output linear is set in the LUT 252.

The block 253 further executes conversion of the CMY data from the copying machine to output color data (color display system data) to the CRT display 300, i.e., the following processing.

$$\begin{bmatrix} Rc \\ Gc \\ Bc \end{bmatrix} = \begin{bmatrix} P_{11} & P_{12} & P_{13} \\ P_{21} & P_{22} & P_{23} \\ P_{31} & P_{32} & P_{33} \end{bmatrix} \times \begin{bmatrix} Rx' \\ Gx' \\ Bx' \end{bmatrix}$$

4-3. Route to Copying Machine

Next, the route from the RGB position matching unit 230 to the copying machine will be described.

The output of the block 230 is input to an LUT 260. The LUT executes normalization correcting processing, negative-positive reversal processing and RGB independent color adjustment processing. The normalization correcting processing is executed so that the ouput range for the input will become a predetermined range at the minimum value of each of the RGB signals. The negative-positive reversal processing is conversion of data read from a negative film to positive data and and to data which is linear relative to the reflectance of the document. The RGB independent color adjustment processing is a procedure for effecting color adjustment on the CRT display 300 to process the input-output relationship independently of the RGB lines. The result of operation on the display 300 is fed back.

The output of LUT 260 is input to a block 261.

In the block 261, R.G.B data is converted to Y.Cr.Cb data, and hue rotation processing is executed by orthogonal coordinate rotation.

Thus, the following processing is executed.

$$\begin{bmatrix} Y \\ Cr \\ Cb \end{bmatrix} = \begin{bmatrix} 1 & 0 & 0 \\ 0 & \cos\theta & -\sin\theta \\ 0 & \sin\theta & \cos\theta \end{bmatrix} \times \begin{bmatrix} 0.299 & 0.587 & 0.114 \\ 0.701 & -0.587 & -0.114 \\ -0.299 & -0.587 & 0.886 \end{bmatrix} \times \begin{bmatrix} R \\ G \\ B \end{bmatrix}$$

For the orthogonal coordinate rotation, the hue rotation angle θ determined by color adjustment on the CRT display 300 is fed back.

The output of the block 261 is input to each of Y.Cr.Cb LUTs 262. The LUT 262 makes color density adjustment, brightness adjustment or contrast adjustment included in the color adjustment procedure on the CRT display 300, and thr result obtained is fed back.

The outputs of the LUTs 262 are fed to blocks 263, 265.

The block 263 executes conversion of the Y.Cr.Cb data to R G B data and color correction of the film reading data to output data of the printer 950 of the copying machine.

Thus, the following is executed.

$$\begin{bmatrix} R \\ G \\ B \end{bmatrix} = \begin{bmatrix} Y_{11} & Y_{12} & Y_{13} \\ Y_{21} & Y_{22} & Y_{23} \\ Y_{31} & Y_{32} & Y_{33} \end{bmatrix} \times \begin{bmatrix} 1 & 1 & 0 \\ 1 & -0.50937 & -0.194208 \\ 1 & 0 & 1 \end{bmatrix} \times \begin{bmatrix} Y \\ Cr \\ Cb \end{bmatrix}$$

To effect the color correction for every color space to ensure an increased color correction effect, the block 265 selects the variation coefficient set $[Y_{ij}]$ by judging the color space from Y.Cr.Cb data The output of the block 263 is fed to and processed by a block 264, i.e., main direction magnification varying-shift-successive copy processing unit. The resulting output data is sent to the copying machine 90 via a driver 234. On the other hand, the data forwarded from the copying machine 90 is fed to the selector 232 via a receiver 234 and a primary-secondary data converter 233. The converter 233 is a block provided for adjustment since the number of data items sent from the copying machine 90 is larger than the number of display memories 240 to 242.

(5) Control of the System (See Flow Charts)

Control in a preview mode will be described next with reference to FIGS. 14 to 18.

Figure 12:
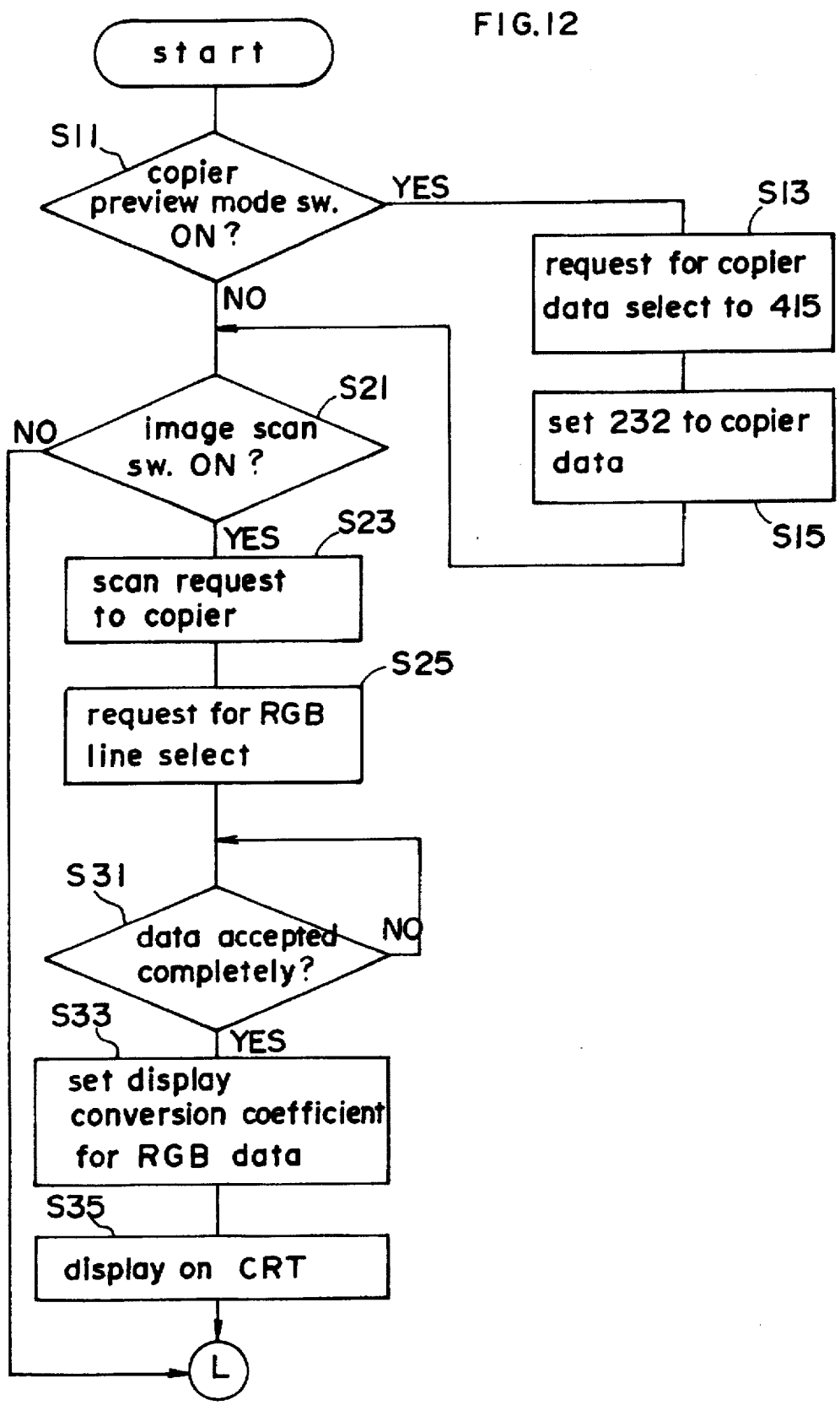
FIG. 12 is a flow chart illustrating a process to be executed by a CPU 1 of FIG. 4, i.e., part of processing in connection with the copying machine preview mode.

5-1. Overall Control: FIG. 12

Figure 9:
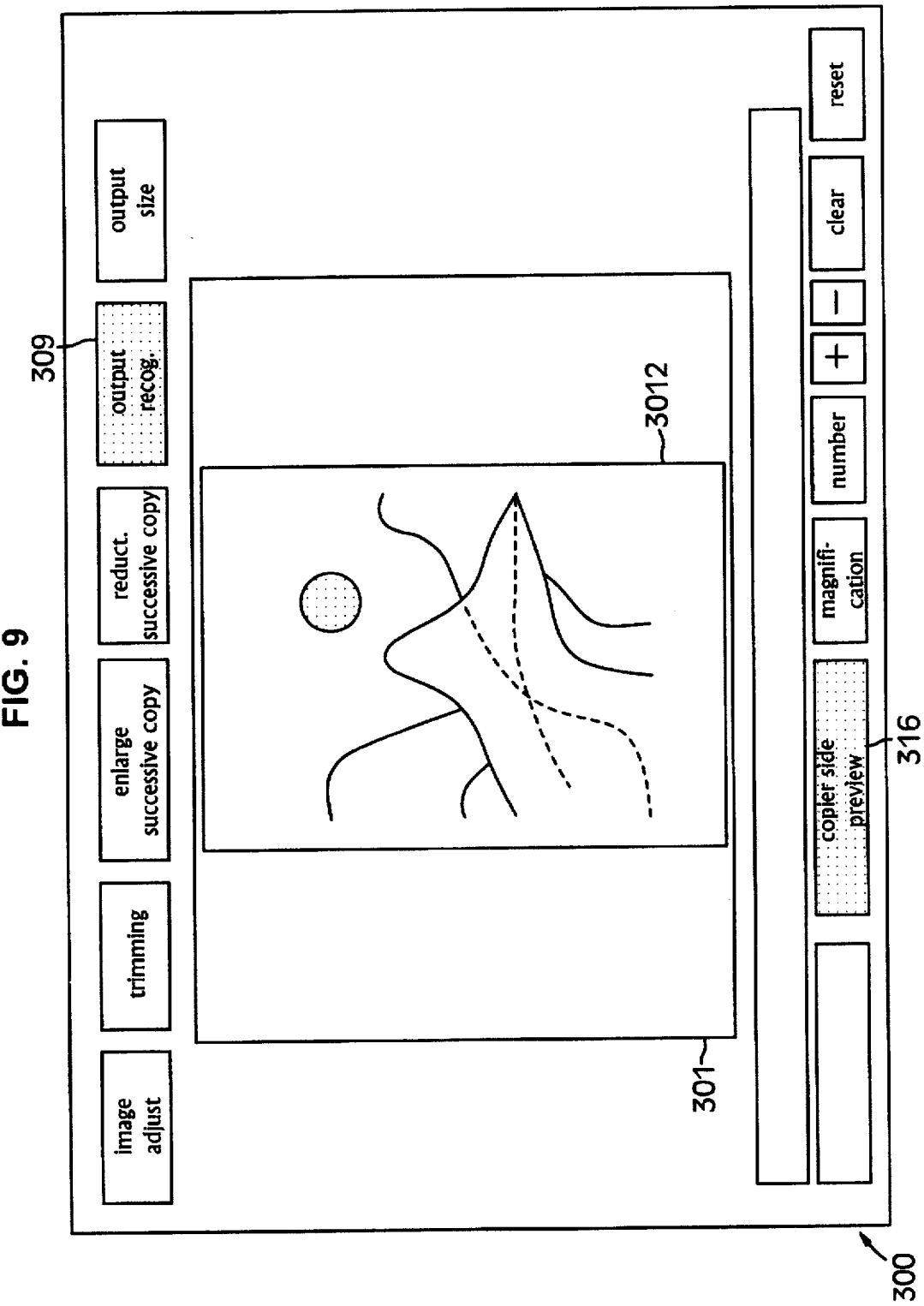
FIG. 9 is a diagram for illustrating a presentation on the CRT display of FIG. 8 in the case where the copying machine is set in a preview mode and an output recognition mode.

First with reference to the screen of FIG. 8, the copying machine preview mode switch 316 is turned on (S11: YES), whereon the switch is shown as reversed as seen in FIGS. 9 to 11, and the copying machine 90 is commanded to change over the selector unit 415 of FIG. 3 "so that the data read by the reader 900 of the machine will be sent to the printer 950 of the machine" (S13). In response to this command, the selector unit 415 of the machine 90 is changed over by the control signal 1 as shown in FIG. 17, steps S521, S523.

Further in corresponding relation with the actuation of the switch 316 (S11: YES), the selector 232 (FIG. 6) of the film scanner device 30 is changed over so as to receive data from the copying machine 90 (from the block 233) (S15).

With the two selectors 415, 232 thus changed over upon the actuation of the preview mode switch 316, the image scan key 353 of FIG. 19 is turned on (S21: YES), whereupon a scan request is given to the copying machine (S23). In corresponding relation with this, the reader 900 of the copying machine reads a document on the document table 901 and produces RGB data as shown in FIG. 17, steps S541, S543. In this case, a single scan movement suffices.

With the actuation of the scan key 353 (S21: YES), the copy machine 90 is commanded to make the driver 450 of FIG. 8 active "so that the RGB data read by the copying machine reader 900 will be sent as it is to the film scanner device 30" (S25). In response to this command, the driver 450 is made active by the control signal 3 in the machine 90 as shown in FIG. 17, steps S531, S533.

The system thereafter remains in a stand-by state until the RGB data from the copying machine is completely received (S31).

When the receipt of the RGB data from the copying machine has been completed (S31: YES), the display conversion coefficient $[Z_{ij}]$ for the RGB data is set in the block 253 of FIG. 6 (S33). Further a presentation based on the data thus received is given on the CRT display 300 (S35).

Figure 13:
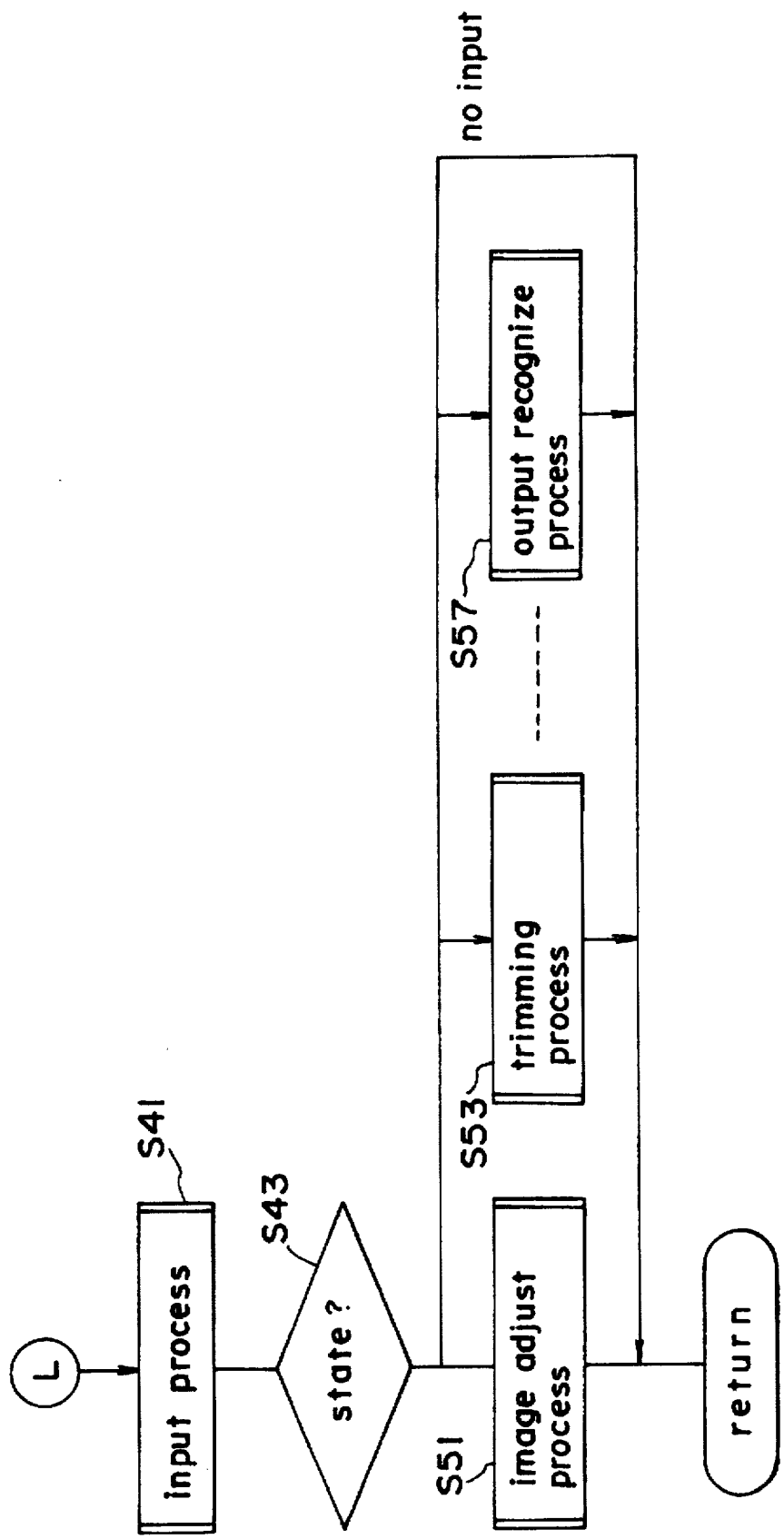
FIG. 13 is a flow chart illustrating a process to be executed by the CPU 1 of FIG. 4, i.e., the remainder of the processing in connection with the copying machine preview mode.
Figure 14:
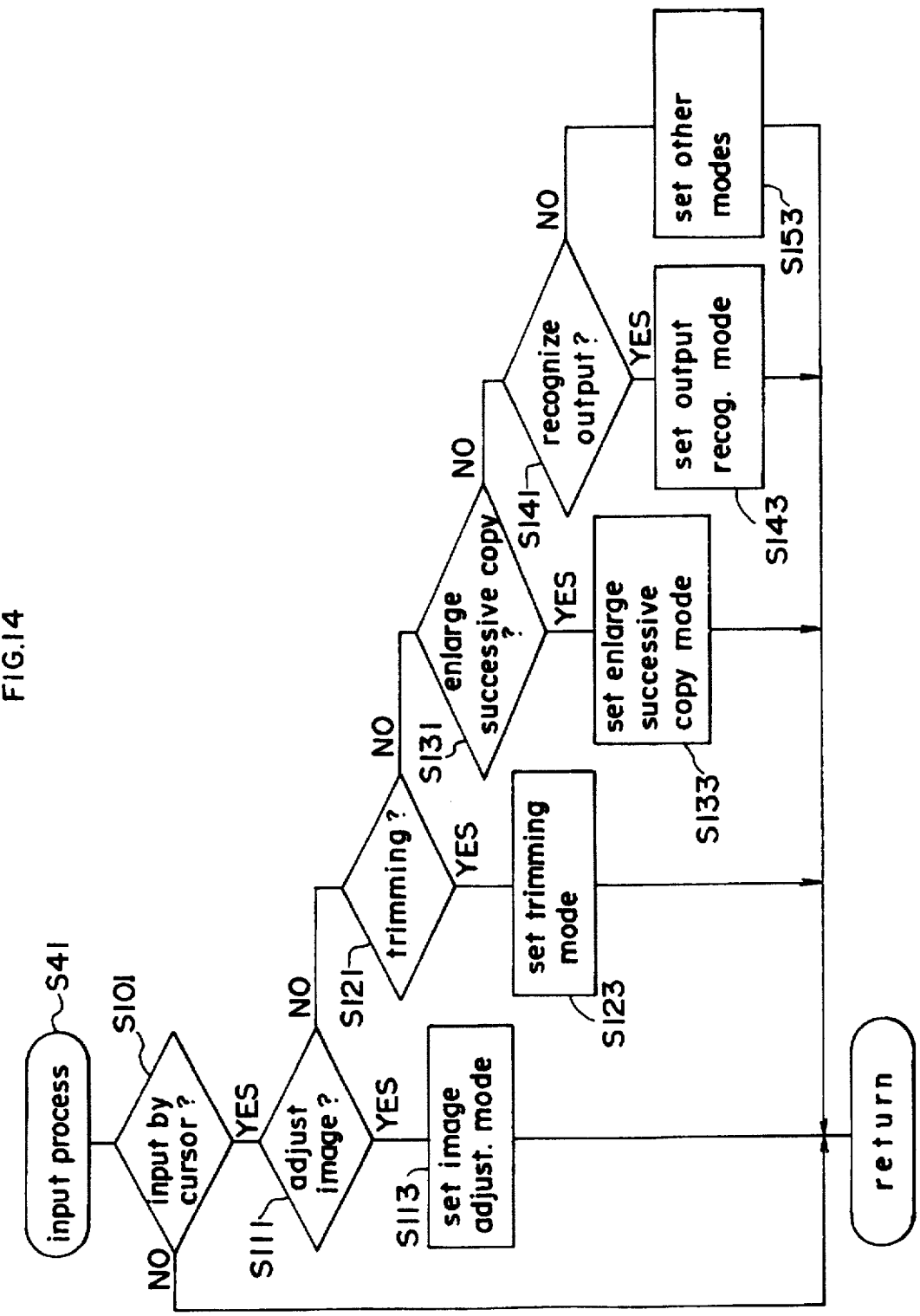
FIG. 14 is a flow chart showing input processing (S41) of FIG. 13.

5-2. Input Processing: FIG. 14 (FIG. 13)

Input processing is executed by step S41. In response to an input given by a display switch (see FIG. 8) specified by the cursor (S101: YES), the mode corresponding to the actuated display switch is set by this procedure as shown in FIG. 14.

For example, when the image adjusting switch 305 is turned on (S111: YES), an image adjusting mode is set (S113), whereby the switch 305 is indicated on reversion as shown in FIG. 10, and a group of switches 3031 for image adjustment are displayed on the pull-down menu display region 303, enabling the user to make color adjustment.

If a completion switch 3032 is turned on in the image adjusting mode, the read image is displayed on the screen in a color equivalent to the color to be reproduced on a hard copy. This process will be described later in detail with reference to FIG. 15.

When the trimming switch 306 is turned on (S121: YES), a trimming mode is set (S123), whereby the trimming switch 306 is shown on reversion as seen in FIG. 11. Furthermore, a group of switches (trimming menu) 3041 for trimming are displayed on the pull-down memu display region 304, and a trimming frame 3011 is shown in the image region 301. Processing in the trimming mode will be described later with reference to FIG. 16.

In the case where the enlarged successive copy switch 307 is turned on (S131: YES), an enlarged successive copy mode is set (S133).

When the output recognition switch 309 is turned on (S141: YES), an output recognition mode is set (S143), whereby the switch 309 is shown on reversion as seen in FIG. 9. A paper frame 3012 is further displayed to show the relationship between the printing-out paper and the image.

Other modes settable by actuating other switches are collectively represented by step S153.

Figure 15:
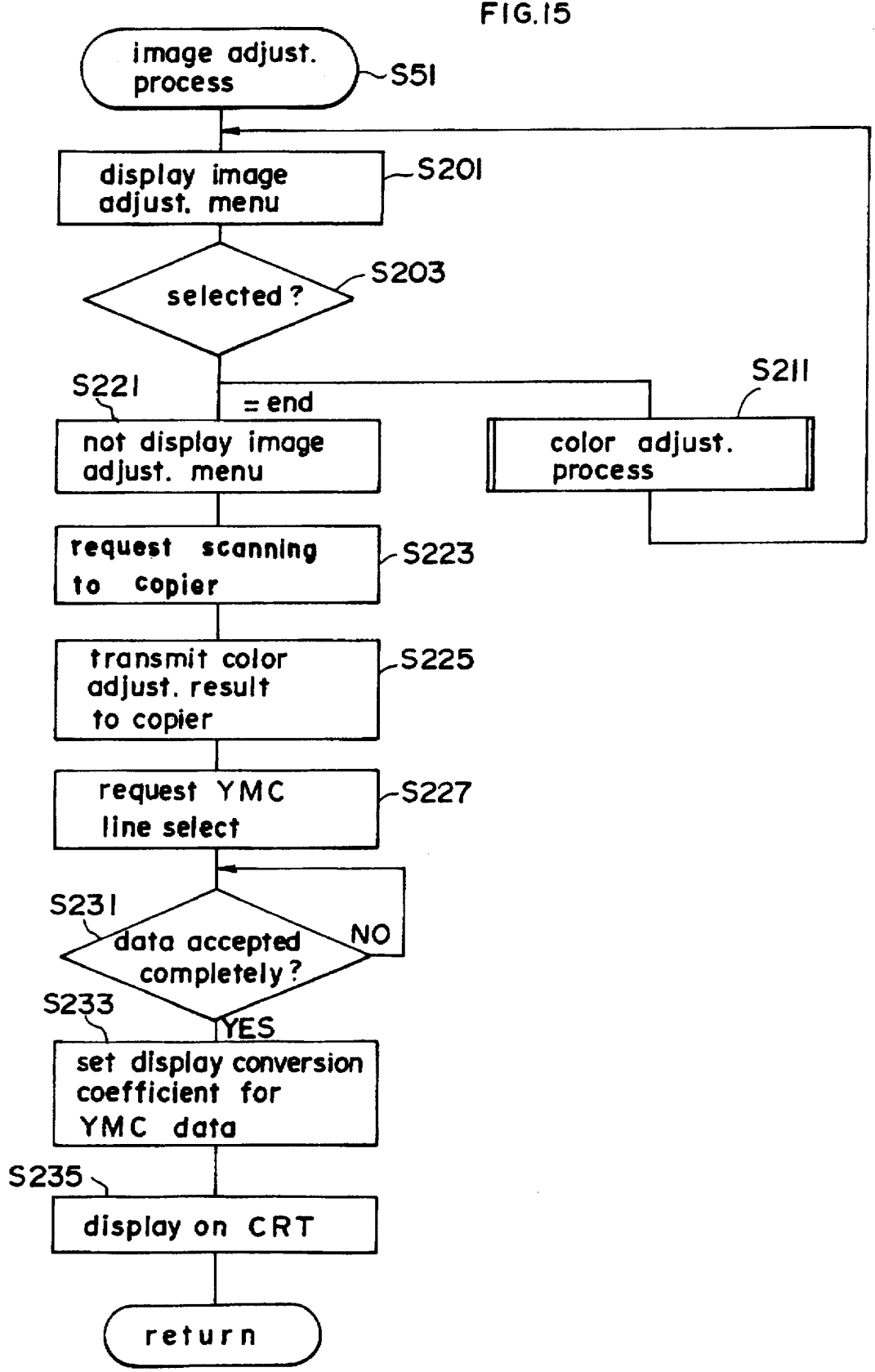
FIG. 15 is a flow chart showing image adjustment processing (S51) of FIG. 13.

5-3. Image Adjustment Processing: FIG. 15

In the image adjusting mode set by step S113, image adjustment processing is executed (S51).

Figure 10:
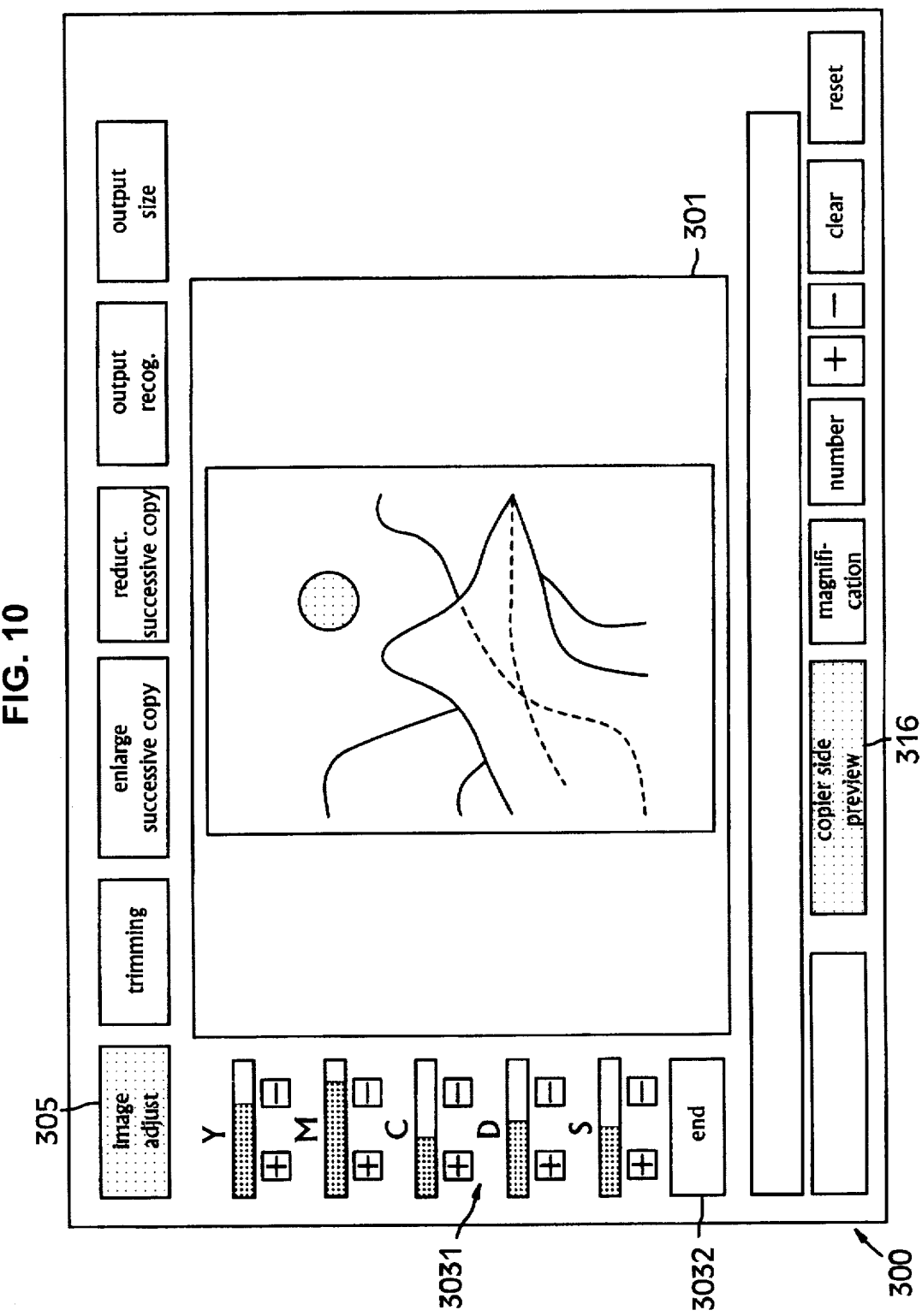
FIG. 10 is a diagram for illustrating a presentation on the CRT display of FIG. 8 in the case where the copying machine preview mode and an image adjusting mode are set.

First with reference to FIG. 10, a group of switches and the like (image adjusting menu) 3031 are displayed in the pull-down menu display region 303 (S201). Further when a switch included in the switch group 3031 is turned on for increasing or decreasing a color such as Y, M, C, D or S (S203/selected), corresponding processing for image color adjustment (color adjustment processing) is executed (S211).

Further with reference to the screen of FIG. 10, the completion switch 3032, when turned on, ceases presentation of the image adjusting menu 3031, 3032. Further transmitted to the copying machine 90 are a request for scanning (S223), result of color adjustment (S225) by step S211 and request for selection of the YMC line (S227).

In response to the request for scanning (S223), the copy machine 90 executes a process for reading the document on the document table 901 to produce RGB data and producing YMC data based on the data as shown in FIG. 17, steps S541, S543. In this case, the scanning movement needs to be repeated three times for preparing the YMC data.

On receiving the data of the color adjustment result (S225), the copying machine 90 corrects the data in the gamma correction unit 445 of FIG. 3 with the result data as shown in FIG. 18, steps S561, S563.

To comply with the request for selecting the YMC line, the control signal 2 renders the driver 460 of the copying machine 90 shown in FIG. 3 active as seen in FIG. 18, steps S551, S553.

After the processing for transmitting the YMC data from the copying machine 90 to the film scanner device 30 has been executed in this way, the system remains in a stand-by state until the YMC data from the machine 90 is completely accepted (S231).

When the YMC data has been completely received (S231: YES), the display conversion coefficient $[P_{ij}]$ for the YMC data is set in the block 253 of FIG. 6 (S233). Further a presentation based on the data thus received is given on the CRT display 300 (S235).

Figure 16:
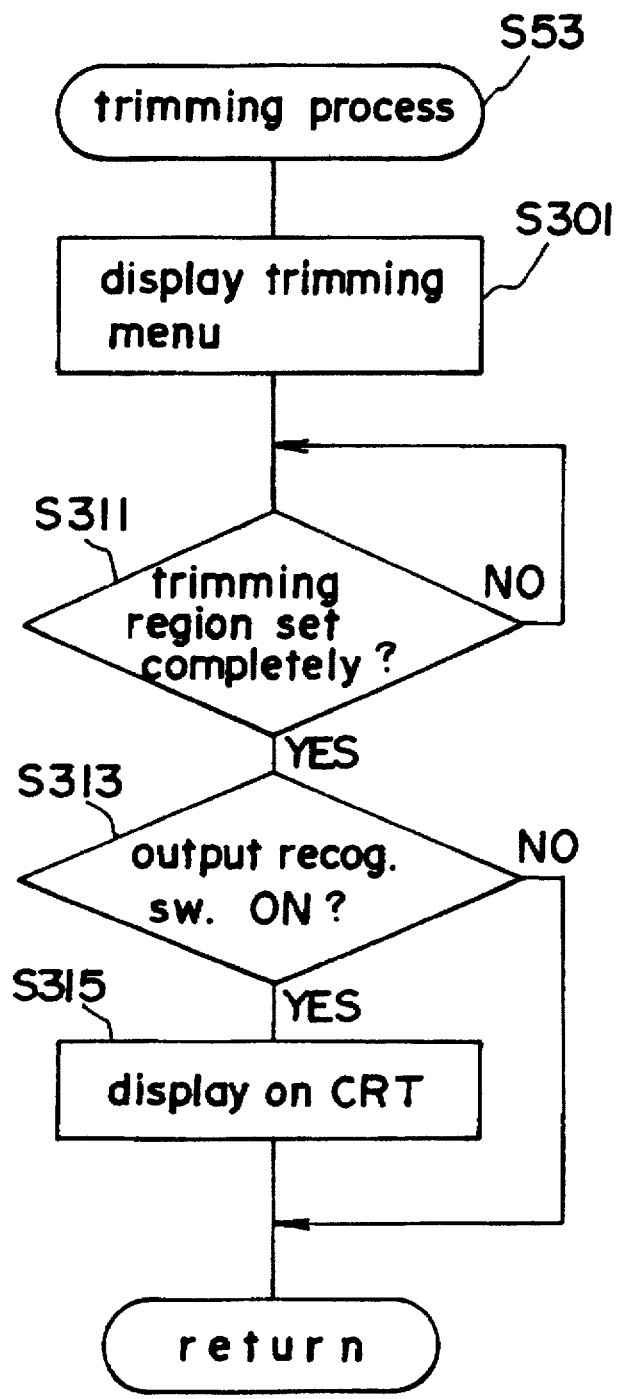
FIG. 16 is a flow chart showing trimming processing (S53) of FIG. 13.

5-4. Trimming Processing: FIG. 16

When the trimming mode is set in step S123 of FIG. 14, trimming processing (S53) is executed.

Figure 11:
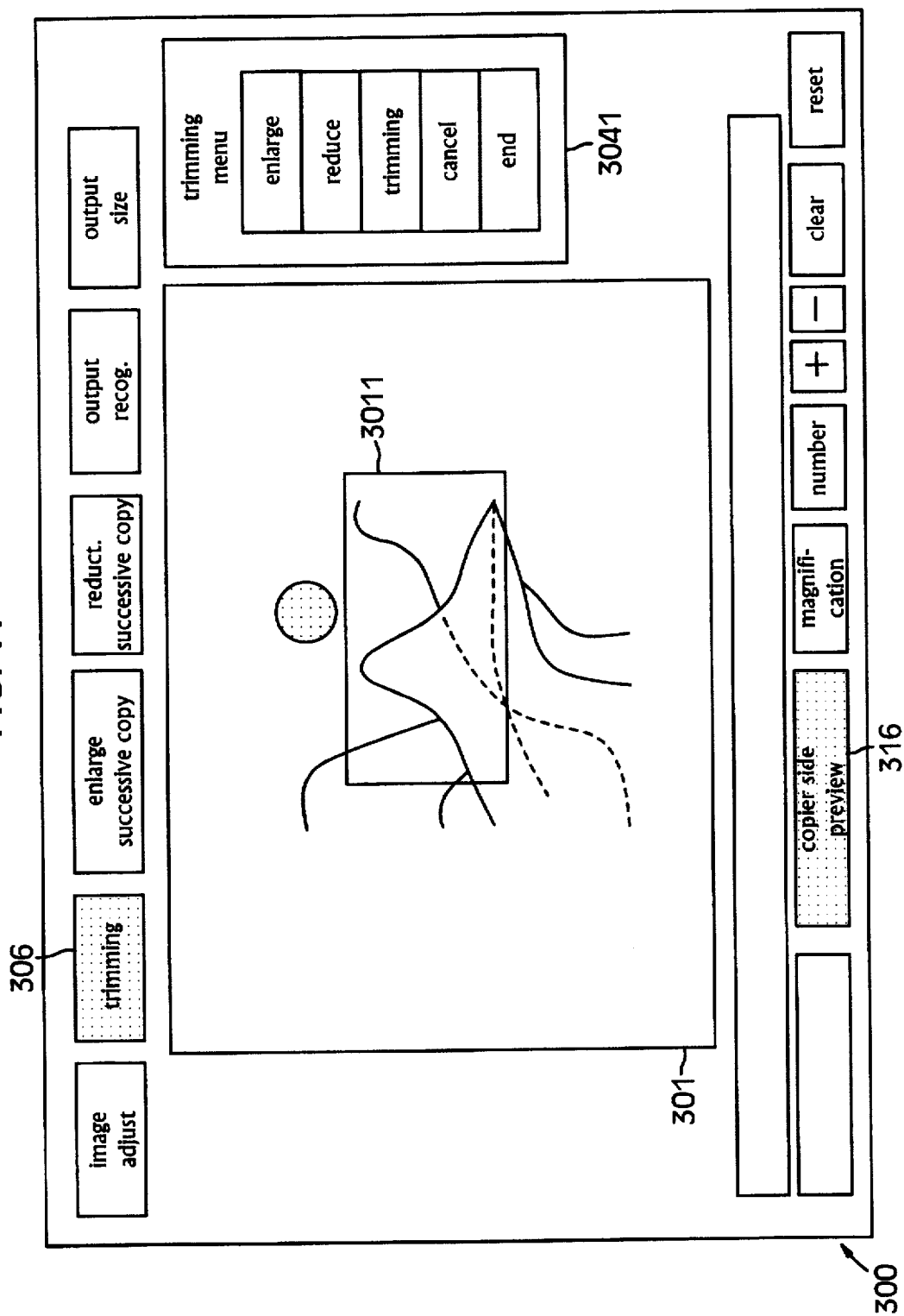
FIG. 11 is a diagram for illustrating a presentation on the CRT display of FIG. 8 in the case where the copying machine preview mode and a trimming mode are set.

First, as shown in FIG. 11, a group of switches (trimming menu) 3041 for trimming are displayed in the pull-down menu display region 304 (S301). Further a trimming frame 3011 freely settable by the cursor is displayed in the image region 301, whereby a trimming region becomes settable.

On completion of setting of the trimming region (S311: YES), the output recognition switch 309 waits for actuation. When it is turned on (S313: YES), the relation between the set trimming region and the paper is shown on the CRT display (S315).

5-5. Receipt of Command: FIGS. 17, 18

Command receipt processing is executed by the CPU 2 of the copying machine 90 for a command transmitted from the film scanner device 30.

Processing of steps S521 to S563 has been referred to in the foregoing description of FIGS. 12 to 16 and therefore will not be described again.

When a request for printing (request transmitted for an input by the copy key 355 of FIG. 19) is forwarded from the scanner device 30 (S571: YES), copying operation processing (S573) is executed. More specifically, the document on the document table 901 is read to produce RGB data, which is then converted to YMC data. Based on the YMC data, an image is formed on paper.

In the case where the aforementioned image adjustment processing has been executed, the data as corrected by the foregoing step S563 is used as the data of the gamma correction unit 445 of FIG. 3. This realizes printing out in a color equivalent to the color as adjusted on the screen.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus for outputting printing data to an image forming apparatus, comprising:

document reading means for reading an image from a document to produce color separation data as to three colors;

image data processing means for converting the color separation data to printing data;

first conversion means for converting the color separation data to display data;

second conversion means for converting the printing data to display data;

selecting means for selecting either the first conversion means or the second conversion means; and display means for displaying an image based on the display data obtained by the first or second conversion means and selected by said selecting means.

2. The image forming apparatus as recited in claim 1, wherein said printing data are yellow data, magenta data and cyan data, while said display data are red data, green data and blue data.

3. The image forming apparatus as claimed in claim 1, further comprising image correcting means for outputting command data to correct the image displayed on the display means so that said image data processing means converts the color separation data to printing data in accordance with said command data.

4. The image forming apparatus as claimed in claim 1, further comprising mode setting means for setting various modes related to processing or printing of an image so that said selecting means selects either the first or second conversion means in accordance with a mode set by said mode setting means.

5. The image forming apparatus as claimed in claim 1, wherein said image data processing means performs gamma correction which corrects a relationship between a density of a read document and a density of an image to be reproduced.

6. An image forming apparatus comprising:

document reading means for reading an image from a document to produce color separation data as to three colors;

image data processing means for converting the color separation data to printing data based on characteristics of the image forming apparatus;

conversion means for converting the printing data obtained by said image data processing means to display data;

display means for displaying an image based on the display data;

image correcting means for outputting command data to correct the image displayed on the display means;

printing data correcting means for correcting the printing data based on output from the image correcting means; and printing means for printing an image on a sheet based on the printing data corrected by the printing data correcting means.

7. The image reading apparatus as recited in claim 8, further comprising:

preview mode setting means for setting preview mode in which the image based on the display data is indicated on the display means before the printing data outputs; and indicating control means for inputting, on setting the preview mode, the display data into the display means.

8. The image reading apparatus as recited in claim 6, wherein said printing data are yellow data, magenta data and cyan data while said display data are red data, green data and blue data.

* * * * *

UNITED STATES PATENT AND TRADEMARK OFFICE
CERTIFICATE OF CORRECTION

PATENT NO. : 5,734,799
DATED : March 31, 1998
INVENTOR(S) : Keiji KUSUMOTO, et al.

It is certified that error appears in the above-indentified patent and that said Letters Patent is hereby corrected as shown below:

ON THE TITLE PAGE

Item [75] Second inventor's name is corrected to Kenichi Muroki

Signed and Sealed this

Seventh Day of July, 1998

*Attest:*

BRUCE LEHMAN

*Attesting Officer*     *Commissioner of Patents and Trademarks*